Patented Feb. 20, 1940

2,191,118

UNITED STATES PATENT OFFICE 2,191,118

PYELOGRAPHIC PREPARATION

Arnold Salomon, Oss, Netherlands, assignor to the firm of N. V. Orgachemia, Oss, Netherlands No Drawing. Application May 27, 1938, Serial No. 210,518. In the Netherlands June 3, 1937

5 Claims. (Cl. 167—95)

This invention relates to a new preparation suitable as a contrast medium for röntgenography of the urinary system in injectable form.

It is an object of the invention to increase the solubility of salts of iodo hippuric acid by means of the addition of some agents capable for increasing that solubility. Another object of the invention is to prepare a stable solution of salts of iodo hippuric acid in such a concentration that the necessary quantity (substantially 12 grams) to be injected is present in a volume corresponding to the contents of a normal medical syringe of 20 cc.

Though sodium iodo hippurate is well soluble in water, its solubility is not sufficient to prepare a solution which contains at least 10 grams sodium iodo hippurate in 20 cc.

For instance a solution containing 12 grams sodium o-iodo hippurate dissolved in water by gentle heating to a final volume of 20 cc. is not stable at room temperature, even a solution of 12 grams hippurate in a volume of 25 cc. crystallizes. Whereas it is desired to inject about 12 grams sodium iodo hippurate by means of the common medical syringe of a contents of only 20 cc. it will be clear that in this way no solution of sufficient concentration or stability can be prepared.

Now I have found that the solubility of iodo hippuric acid salts is markedly increased when urethanes or pyrazolones in relatively low amounts are added. As an urethane may be used ethyl or methyl urethane and as a pyrazolone derivative 1-phenyl-2.3-dimethyl-5-pyrazolone comes into consideration, but also other derivatives of the basic compounds referred to are suitable.

The following examples are given to elucidate the invention.

*Example 1.*—12 grams sodium o-iodo hippurate and 250 mg. ethyl urethane are dissolved by gentle heating in water to a final volume of 20 cc. This solution is filled up in an ampoul and can be kept for unlimited time at room temperature or at lower temperatures for instance between 0–10° C. without crystallisation occurring.

A solution of the same concentration without addition of urethane and even when the same quantity of sodium iodo hippurate is dissolved to 25 cc. shows itself to be unstable as crystallisation occurs.

*Example 2.*—12 grams sodium o-iodo hippurate and 300 mg. 1-phenyl-2.3-dimethyl-5-pyrazolone are dissolved in water to a final volume of 20 cc. A stable clear solution is obtained which is not the case if no pyrazolone has been added.

What I claim is:

1. A stable aqueous solution comprising 12–15 grams sodium o-iodo hippurate and 0.1–1 gram ethyl urethane per 20 cc. final solution.

2. A stable aqueous solution comprising substantially 12 to 15 grams sodium o-iodo-hippurate and 0.1 to 1.0 grams 1-phenyl-2.3-dimethyl-5-pyrazolone per 20 cc. of solution.

3. A stable aqueous solution of a salt of o-iodo-hippuric acid containing substantially more hippuric acid than is normal in an aqueous solution and a small amount of a stabilizing agent selected from the class consisting of urethanes and pyrazolones.

4. A stable aqueous solution comprising 12 grams sodium o-iodo-hippurate and 0.3 gram 1-phenyl-2,3-dimethyl-5-pyrazolone per 20 cc. of solution.

5. A stable aqueous solution comprising 12 grams sodium o-iodo-hippurate and 0.25 gram ethyl urethane per 20 cc. final solution.

ARNOLD SALOMON.